(12) United States Patent
Pai

(10) Patent No.: US 8,868,754 B1
(45) Date of Patent: *Oct. 21, 2014

(54) DYNAMICALLY POPULATING AN IDENTITY-CORRELATION DATA STORE

(71) Applicant: Symantec Corporation, Mountain View, CA (US)

(72) Inventor: Manish Pai, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,658

(22) Filed: May 16, 2013

Related U.S. Application Data

(63) Continuation of application No. 13/048,791, filed on Mar. 15, 2011, now Pat. No. 8,510,446.

(51) Int. Cl.
    G06F 15/173 (2006.01)
    H04L 12/26 (2006.01)
(52) U.S. Cl.
    CPC ............................ *H04L 43/04* (2013.01)
    USPC ................... 709/226; 709/203; 709/224

(58) Field of Classification Search
    USPC .......................................... 709/203, 224, 226
    See application file for complete search history.

(56) References Cited

U.S. PATENT DOCUMENTS

| | | | |
|---|---|---|---|
| 8,250,085 B1* | 8/2012 | Satish | 707/758 |
| 8,341,734 B1* | 12/2012 | Hernacki et al. | 726/21 |
| 8,510,446 B1* | 8/2013 | Pai | 709/226 |
| 2003/0225742 A1* | 12/2003 | Tenner et al. | 707/2 |
| 2008/0157969 A1* | 7/2008 | Beringer | 340/572.1 |
| 2011/0083159 A1* | 4/2011 | Brown et al. | 726/1 |
| 2011/0083190 A1* | 4/2011 | Brown et al. | 726/26 |
| 2012/0150773 A1* | 6/2012 | DiCorpo et al. | 706/12 |

* cited by examiner

*Primary Examiner* — Liangche A Wang
(74) *Attorney, Agent, or Firm* — Lowenstein Sandler LLP

(57) ABSTRACT

A method and apparatus for detecting a violation of a data loss prevention (DLP) policy and correlating an external identifier of an incident record of the violation to a unique internal identifier using an identity-correlation data store are described.

20 Claims, 9 Drawing Sheets

Incident Record    600

| Incident Details | |
|---|---|
| Server | DD server |
| Agent Response | Action Blocked ○ |
| Occurred On | 2/14/11 3:22 PM |
| Reported On | 2/14/11 3:25 PM |
| User | DD-WIN2003\administrator |
| User Justification | User Education: "I did not know transferring this data was restricted." |
| Machine Name | DD-WIN2003 |
| Machine IP (Corporate) | 10.209.191.33 |
| Endpoint Location | On the Corporate Network |
| Application | Yahoo! Messenger, Yaoo! Inc. (YahooMessenger.exe) |
| Sender | mp38402kd |
| Recipient | d293jskld0491did |
| Destination IP | 98.136.48.105:5050 |
| Data Owner Name | [ change ] |
| Data Owner Email Address | [ change ] |

Incident Details

| | |
|---|---|
| Server | DD server |
| Agent Response | Action Blocked ○ |
| Occurred On | 2/14/11 3:22 PM |
| Reported On | 2/14/11 3:25 PM |
| User | DD-WIN2003\administrator |
| User Justification | User Education: "I did not know transferring this data was restricted." |
| Machine Name | DD-WIN2003 |
| Machine IP (Corporate) | 10.209.191.33 |
| Endpoint Location | On the Corporate Network |
| Application | Yahoo! Messenger, Yaoo! Inc. (YahooMessenger.exe) |
| Sender | domain\some.user (mp38402kd) — 651 |
| Recipient | [cha... |
| Destination IP | 98.1... |
| Data Owner Name | [ change ] |
| Data Owner Email Address | |

Tooltip (652): The user domain\some.user has used the following identities
- Yahoo Messanger ID [mp38402kd@yahoo.com]
- Facebook ID [mprosue23@yahoo.com]
- Gmail ID [someuser@gmail.com]

Moving mouse over sender identity would show more details as tooltip

Updated Incident Record
650

DYNAMICALLY POPULATING AN IDENTITY-CORRELATION DATA STORE

RELATED APPLICATION

This application is a continuation of U.S. patent application Ser. No. 13/048,791, filed Mar. 15, 2011, which is hereby incorporated by reference in its entirety. This application is related to co-pending application U.S. Ser. No. 13/895,643, filed May 16, 2013, and the entire contents of which are incorporated herein by reference.

TECHNICAL FIELD

Embodiments of the invention relate to the field of processing data, and more particularly, to improving data loss prevention (DLP) by dynamically populating an identity-correlation data store to correlate different identities of users.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor. Furthermore, these complex communications often occur using different identities, such as communications associated with identifiers that are not assigned by the entity (referred to herein as external identifiers).

A typical user may have more than one identity in computing environments. For example, an entity, such as a corporate enterprise system, may assign a unique internal identifier to users to use the computing resources and computing services of the entity. For example, these unique identifiers can be used for logging into computing systems of the entity's networks, accessing computing resources on the network, and for controlling access to resources within the enterprise. Often, users access other external resources and services that are available in the public domain via the Internet, such as by communicating with an external service over the Internet. These external entities may also assign an identifier to the same user for access or for identifying the user with these external services. These identifiers are considered external identifiers because they are not assigned by the entity, as contrasted with internal identifiers assigned by the entity. The same user may have many external identifiers, such as instant messenger identifiers (e.g., Yahoo messenger identifier (ID), MSN messenger ID, Google Chat ID, etc,), mail identifiers (e.g., Google Mail ID, etc), social networking identifiers (e.g., Facebook identifier), or other types of identifiers. Most of the time, these identifiers may be cryptic and may not be used by an entity to easily identify a particular user that is accessing or using the entities' computing resources or services.

Existing DLP technologies can detect violations of different DLP policies, and generate incident records for different events such as data leaks through instant messaging (IM) events, Universal Serial Bus (USB) data transfer events, file transfer events, electronic message (email) events, and printing events. However, in the case of the IM event, the messenger ID is reported with the incident. Similarly, in the case of the USB event, the operating system's user identifier is reported. These are both identifiers that can be cryptic and difficult to correlate with the user of the entity (e.g., employee of a corporation).

Existing security techniques fail to provide efficient solutions that can protect organizations in the situations described above. These existing DLP technologies do not have a way to correlate all the identities to a single user, and thus, when looking at an incident record, it is not easy to identify the user associated with that incident record. In addition, it is difficult to find all activities performed by a single user when the user uses different identities for different operations.

SUMMARY OF THE INVENTION

A method and apparatus for dynamically populating an identity-correlation data store and using the identity-correlation data store to correlate external identifiers and unique internal identifiers are described. In one exemplary embodiment of a method, a computing system, using an agent, monitors outbound activities performed by the computing system, and captures an external identifier from each of the outbound activities. The agent sends the external identifier to a server computing system having an identity-correlation data store. The identity-correlation data store maps external identifiers to unique internal identifiers that have been assigned to users by an entity. The external identifiers are not assigned by the entity. In yet a further embodiment, the agent is a DLP agent that detects one or more violations of a DLP policy, and creates incidents of the violations. The incident records have one of the external identifiers being used by a particular user when the violation occurred. The DLP agent sends the incident record to the server computing system. The server computing system updates the incident record to include the unique internal identifier corresponding to the particular user associated with the external identifier in the incident record to identify the particular user associated with the incident record.

In one embodiment, the method monitors outbound network traffic, outbound data transfers, and/or printing activities. Alternatively, the method may monitor other outbound activities as would be appreciated by one of ordinary skill in the art having the benefit of this disclosure.

In yet another embodiment, the method intercepts an application-specific login packet (e.g., a POST request) sent to an external service by a particular user of the computing system. For example, an application sends a login request to an application server hosting the external service (e.g., instant messaging application). After intercepting the login packet, the method extracts the external identifiers from the intercepted login packet. In one embodiment, the method also decodes the packet or request when the packet or request is encoded.

In yet another embodiment, the method captures one of the unique internal identifiers when one of the users of the computing system logs into the computing system or a service provided by the entity, and sends the captured unique internal identifier to the server computing system having the identity-correlation data store. When received, the server computing system creates an entry in the identity-correlation data store when there are no entries containing the captured unique internal identifier.

In another embodiment of the method, a identity management server, hosted by a server computing system, receives from one or more of the agents, hosted on the client computing systems one or more external identifiers captured by the agents while monitoring outbound activities performed by the client computing systems. The identity management server then maps each of the external identifiers to a unique internal identifier in an identity-correlation data store. The unique internal identifiers are assigned to the users by an entity, and the external identifiers are not assigned by the entity. In yet another embodiment, the agents are DLP agents, and the identity management server communicates with a DLP system hosted by the server computing system or hosted by another server computing system. The DLP system receives an incident record of a violation of a DLP policy from one of the DLP agents. The incident record includes one or more external identifiers. The DLP system uses the identity management server to identify a corresponding one of the unique internal identifier correlated to the one external identifier in the incident record using the identity-correlation data store. The unique internal identifier can be used to identify the user that caused the violation. In one embodiment, the identity management server performs a look-up operation in the identity-correlation data store using the external identifier in the incident record to identify the particular user. In yet another embodiment, the identity management server receives the unique internal identifiers from the client computing systems. The agent captures the unique internal identifier when the user logs into the client computing system or a service provided by an entity. The identity management server creates an entry in the identity-correlation data store when there are no existing entries containing the captured unique internal identifier.

In yet another embodiment, the identity management server receives an intercepted login packet, captured by the agent, and extracts the external identifier from the intercepted packet or request on the server side.

In addition, a computer readable storage medium for dynamically populating an identity-correlation data store and using the identity-correlation data store to correlate external identifiers and unique internal identifiers are described. An exemplary computer readable storage medium provides instructions, which when executed on a processing system causes the processing system to perform a method such as the exemplary methods discussed above.

Further, systems and apparatus for dynamically populating an identity-correlation data store and using the identity-correlation data store to correlate external identifiers and unique internal identifiers are described. An exemplary apparatus may include a data storage device to store an identity-correlation data store that maps external identifiers to unique internal identifiers assigned to users by an entity, and wherein the external identifiers are not assigned by the entity. The computing system may execute an identity management server that may include an identity interception component. The identity interception component is to receive external identifiers captured by one or more agents monitoring outbound activities performed by one or more client computing systems. The identity interception component maps each of the external identifiers to a corresponding one of the unique internal identifiers in the identity-correlation data store.

In yet another embodiment, the server computing system executes a DLP system having a reporting component that receives an incident record of a violation of a DLP policy from a DLP agent. The DLP system, using the identity management server, identifies a corresponding one of the unique internal identifiers correlated to the one external identifier in the incident record to identify the particular user associated with the external identifier, and updates the incident record to include the identified unique internal identifier.

In yet another embodiment, the system includes a client computing system, communicatively coupled to the server computing system, configured to execute an agent having a monitoring component and an identity extraction component. The monitoring component monitors outbound activities performed by the client computing system, and the identity extraction component captures an external identifier from each of the outbound activities and sends the captured external identifiers to the server computing system having the identity-correlation data store. The monitoring component may monitor outbound network traffic, outbound data transfers, and/or printing activities. In yet another embodiment, the identity extraction component includes a packet interceptor that captures a login packet sent by an application to an external service hosted by an application server. The identity extraction component may also include a packet data parser that receives the captured login packet from the packet interceptor and to extract the external identifier from the captured login packet. The identity extraction component may also include a transmitter to send the extracted external identifier to the server computing system having the identity-correlation data store. In one embodiment, the extraction component decodes the login packet when the packet or request is encoded. In yet another embodiment, the extraction component captures one of the unique internal identifiers when one of the users of the client computing system logs into the client computing system or a service provided by the entity and sends the captured unique internal identifier to the server computing system having the identity-correlation data store. The server computing system creates an entry in the identity-correlation data store when there are no entries containing the captured unique internal identifier.

In yet another embodiment, the client computing system executes a DLP agent that includes a detection component and a reporting component. The detection component detects a violation of a DLP policy. The reporting component creates an incident record of the violation, the incident record having the external identifier, and sends the incident record to the DLP system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6A illustrates an incident record having an external identifier according to one embodiment.

FIG. 6B illustrates an updated incident record having a unique internal identifier associated with the external identifier in the incident record according to one embodiment.

DETAILED DESCRIPTION

Figure 1:
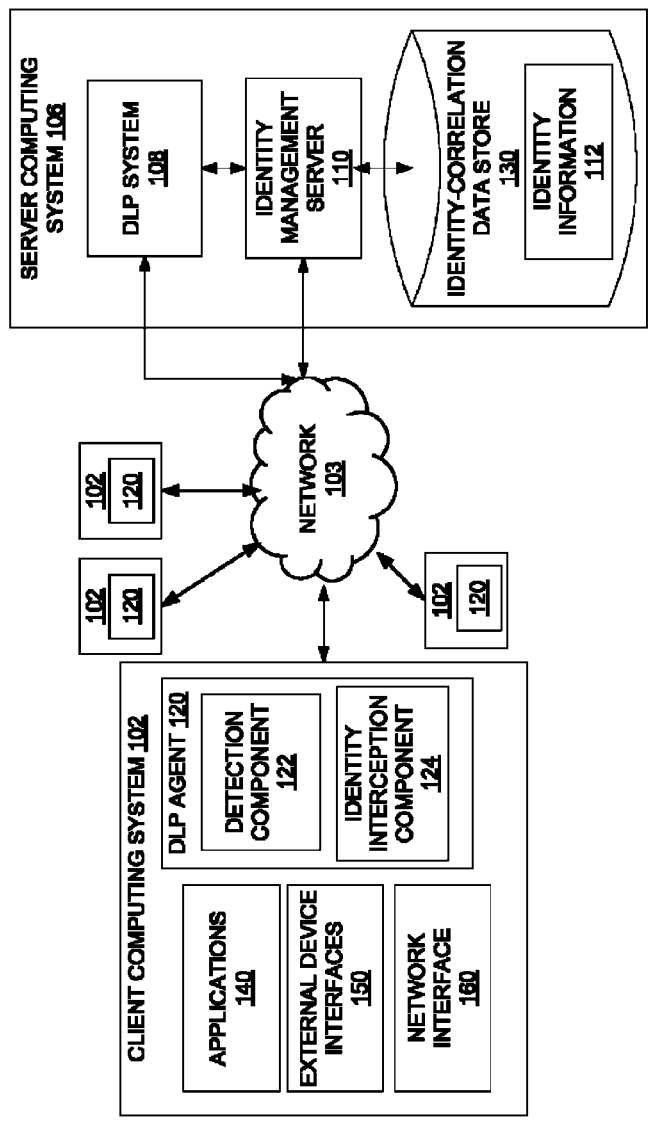
FIG. 1 is a block diagram of exemplary network architecture in which embodiments of the invention may operate.

A method and apparatus for dynamically populating an identity-correlation data store and using the identity-correlation data store to correlate external identifiers and unique internal identifiers are described. In one embodiment, an agent hosted by a client computing system monitors outbound activities performed by the client computing system. The agent captures an external identifier from each of the outbound activities, and sends the external identifier to a server having an identity-correlation data store. The identity-correlation data store maps external identifiers to unique internal identifiers assigned to users by an entity. The external identifiers are not assigned by the entity. In another embodiment, the agent is a DLP agent that detects a violation of a DLP policy, creates an incident record of the violation of the DLP policy, and sends the incident record to the server computing system. The incident record includes the external identifier being used by a particular user when the violation occurred. A DLP system can receive the incident record and use the identity-correlation data store to update the incident record to include the unique internal identifier corresponding to the particular user associated with that external identifier.

In another embodiment, a server computing system executes an identity management server. The identity management server dynamically populates an identity-correlation data store that maps unique internal identifier, assigned by an entity, to external identifiers that are not assigned by the entity. In one embodiment, the identity management server receives from one or more agents multiple external identifiers while the agents monitor outbound activities of a client computing system. The identity management server maps each of the external identifiers to a corresponding one of a multiple unique internal identifiers in an identity-correlation data store. In another embodiment, the server computing system executes a DLP system that receives an incident record of a violation of a DLP policy from a DLP agent, the incident record including an external identifier for one of the users. The DLP system uses the identity management server to identify a corresponding one of the users by performing a look-up in the identity-correlation data store with the external identifier to locate a corresponding one of the unique internal identifiers assigned to the particular user.

As described above, existing DLP technologies cannot correlate multiple user identities to a single user. The embodiments described herein allow correlation of multiple external identifiers to a unique internal identifier corresponding to a single user. The embodiments described herein provide an improved DLP system that allows the incident records to be updated with internal identifiers. These embodiments may be used to easily identify which user caused the incident record and to find all activity performed by the single user when the user uses different identities.

In the following description, numerous details are set forth. It will be apparent, however, to one of ordinary skill in the art having the benefit of this disclosure, that embodiments of the present invention may be practiced without these specific details.

FIG. 1 is a block diagram of an exemplary network architecture 100 in which embodiments of the invention may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. The server computing system 106 may host a DLP system 108 and an identity management server 110. In one embodiment, the server computing system 106 may be part of an organization, such as a corporate enterprise.

The identity management server 110 may communicate with agents 120, which have been labeled as DLP agents 120. Although the embodiments may be used in a DLP system, the embodiments may also be used in other applications for dynamically populating an identity-correlation data store for mapping multiple identities to a single user as would be appreciated by one of ordinary skill in the art having the benefit of this disclosure.

The agents 120 include an identity interception component 124, which is configured to monitor outbound activities performed by the client computing system 102, to capture an external identifier from each of the outbound activities, and to send the captured external identifiers to the server computing system 106 having the identity management server 110. The identity management server 110 receives from the agents 120 the external identifiers captured by the agents while monitoring the outbound activities, and maps the external identifiers to corresponding ones of the unique internal identifiers in the identity-correlation data store 130. The identity-correlation data store 130 can be one or more centralized data repositories that store the identity information 112, such as a look-up table storing the mappings between external and internal identifiers. The identity-correlation data store 130 may represent a single or multiple data structures (databases, repositories, files, etc.) residing on one or more mass storage devices, such as magnetic or optical storage based disks, tapes or hard drives. Although illustrated as being local to the server computing system 106, the identity-correlation data store 130 may be remote from the server computing system and the server computing system 130 can communicate with the identity-correlation data store 130 over a public or private network, or over a direct connection. The identity-correlation data store 130 may be, for example, part of a network-attached storage (NAS) system or a storage area network (SAN) system.

In another embodiment, the agents 120 are DLP agents including the identity interception component 124 and a detection component 122. The DLP system 108 may communicate with DLP agents 120 on the client computing systems 102 to perform operations to enforce a DLP policy as described herein. The detection component 122 is configured to monitor the outbound activity as well to detect a violation of a DLP policy. In response, the DLP agent 120 creates an incident record of the violation, and sends the incident record to the DLP system 108. The incident record includes the external identifier being used by a particular user when the violation occurred. The DLP system 108 is configured to receive the incident record of the violation from the DLP agent 120, and identify a corresponding unique internal identifier correlated to the external identifier in the incident record. The DLP system 108 updates the incident record to include the unique internal identifier. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the identity-correlation data store to get the unique internal identifiers from an external identifier.

Although only the server computing system 106 is illustrated in FIG. 1, the DLP system 108 and/or identity management server 110 may be hosted on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the identity management server 110 and the DLP system 109 are part of an organization's system referred to herein as entity. In another embodiment, a service provider hosts the identity management server 110 and the DLP system 108. The hosted service provider may also have multiple instances of the identity management server 110 and the DLP system 108 on multiple networks that communicate with the service provider over a public or private network. In another embodiment, two separate service providers host the identity management server 110 and the DLP system 108. It should be noted that various other network configurations can be used including, for example, hosted configurations, distributed configurations, centralized configurations, etc.

The depicted client computing system 102, which may operate as an endpoint machine in an enterprise network that uses the identity management server 110 and the DLP system 108 to enforce one or more DLP policies, includes a DLP agent 120 that communicates with the DLP system 108. Embodiments of the DLP agent 120 are described below with respect to FIGS. 2-4B. The client computing system 102 may include applications 140, external device interfaces 150, and network interfaces 160 that can be monitored by the DLP agent 102 as would be appreciated by one of ordinary skill in the art having the benefit of this disclosure.

Figure 2:
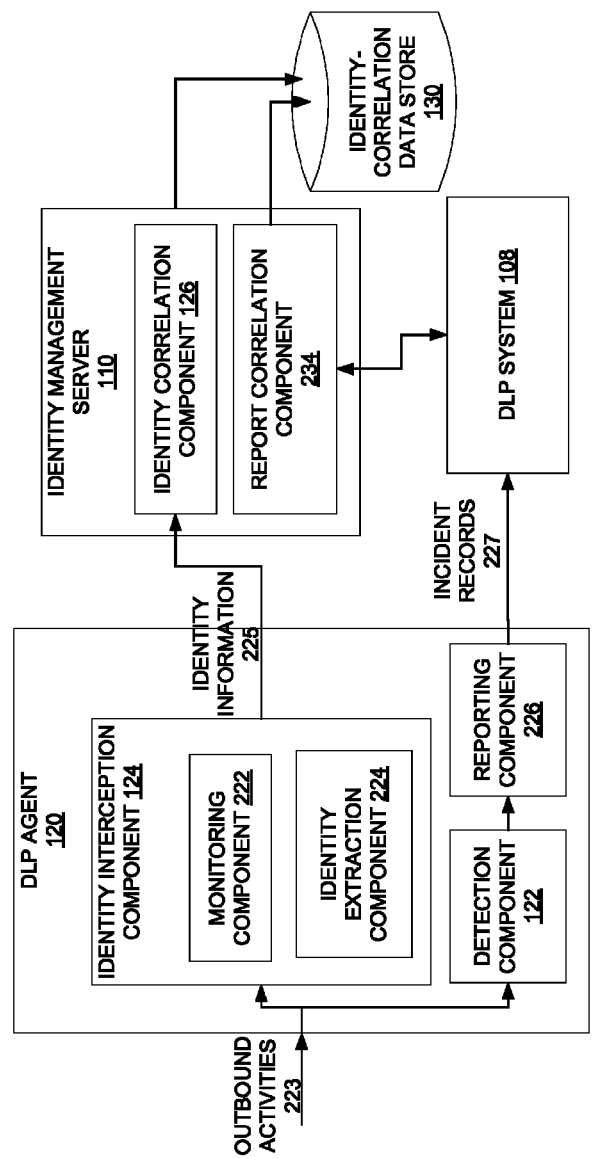
FIG. 2 is a block diagram of one embodiment of a DLP agent, including an identity interception component configured to communicate with an identity management server and a DLP system.

FIG. 2 is a block diagram of one embodiment of a DLP agent 120, including the identity interception component 124 configured to communicate with the identity management server 110 and the DLP system 108. The DLP agent 120 also includes the detection component 122, as described above with respect to FIG. 1, and a reporting component 226. In the depicted embodiment, the identity interception component 124 includes a monitoring component 222 to monitor outbound activities 223. The outbound activities 223 may include data in transit, such as data associated with outgoing messages or other network traffic being sent by the client computing system 102. The outbound activities 223 may include data for data transfers, data associated with printing activities, or other outbound activities where data is being sent by the client computing system 102 via a wireless or wired connection to another device or to a remote device, such as, for example, a removable storage drive.

The identity extraction component 224 is configured to capture identity information 225 from the outbound activities 223 and send the identity information to the identity management server 110. The captured identity information 225 may include external identifiers, unique internal identifiers, machine names, location information, as well as other information as would be appreciated by one of ordinary skill in the art having the benefit of this disclosure.

The identity interception component 124 sends the identity information 225 to the identity interception component 126 of the identity management server 110. The identity interception component 126 uses the identity information 225 to populate the identity-correlation data store 130. In one embodiment, the identity interception component 126 maps the external identifiers to unique internal identifiers in the identity-correlation data store 130. As described herein, the external identifiers are not assigned by an entity managing the identity management server 110 or DLP system 108, whereas the unique internal identifiers are assigned to users by the entity. An entity may refer to a system of an organization to which a user belongs, a system administrator of the organization, or the like. A unique internal identifier is an identifier for recognizing a user by various components of the organization's system.

As described above, the detection component 122 is configured to monitor the outbound activity 223 to detect a violation of a DLP policy. When the detection component 122 detects the violation, the reporting component 226 creates an incident record 227 of the violation, and sends the incident record 227 to the DLP system 108. The incident record 227 includes the external identifier being used by a particular user of the client computing system 102 when the violation occurred. FIG. 6A illustrates an example of an incident record having an external identifier according to one embodiment.

The DLP system 108 is configured to receive the incident record 227 of the violation from the reporting component 226, and identify a corresponding unique internal identifier correlated to the external identifier in the incident record using the identity-correlation data store 130. In one embodiment, the DLP system 108 communicates with the identity management server 110 to determine the unique internal identifier corresponding to the external identifier found in the incident record 227. In the depicted embodiment, the identity management server 110 includes a report correlation component 234 that receives a request from the DLP system 108 to identify the unique internal identifier corresponding to the found external identifier. Upon receiving the request, the report correlation component 234 performs a look-up operation with the external identifier to retrieve the unique internal identifier corresponding to the external identifier, and sends the unique internal identifier back to the DLP system 108.

In one embodiment, the DLP system 108 sends the incident record 227 with the request to the identity management server 110, and the report correlation component 234 can update the incident record to include the unique internal identifier retrieved from the identity-correlation data store 130. The report correlation component 234 can send the updated incident record back to the DLP system 108. In another embodiment, the DLP system 108 does not send the incident record 227 with the request, and the report correlation component 234 sends the unique internal identifier back to the DLP system 108. The DLP system 108 updates the incident record 227 to include the unique internal identifier. The incident records 227 can be stored in data storage for later reviewing by an operator or administrator. FIG. 6B illustrates an example of an updated incident record having a unique internal identifier corresponding to the external identifier in the original incident record according to one embodiment.

In another embodiment, the identity management server 110 may be part of the DLP system 108, and the identity management server 110 can access the identity-correlation data store 130 as local or remote storage to the server computing system 106. In this embodiment, the DLP system 108 receives the incident records 227, and performs the look-up operations to identify the corresponding unique internal identifiers to update the incident records 227.

In another embodiment, the report correlation component 234 is configured to provide tooltip functionality to the updated incident report. A tooltip, also called infotip, is a common graphical user interface element that is typically used in conjunction with a cursor (e.g., mouse pointer). The user hovers the cursor over an item, and without clicking the item, the tooltip may appear. The tooltip may include additional identity information about the identified user. FIG. 6B illustrates an exemplary tooltip that provides additional information about the user identified in the updated incident record.

Figure 3A:
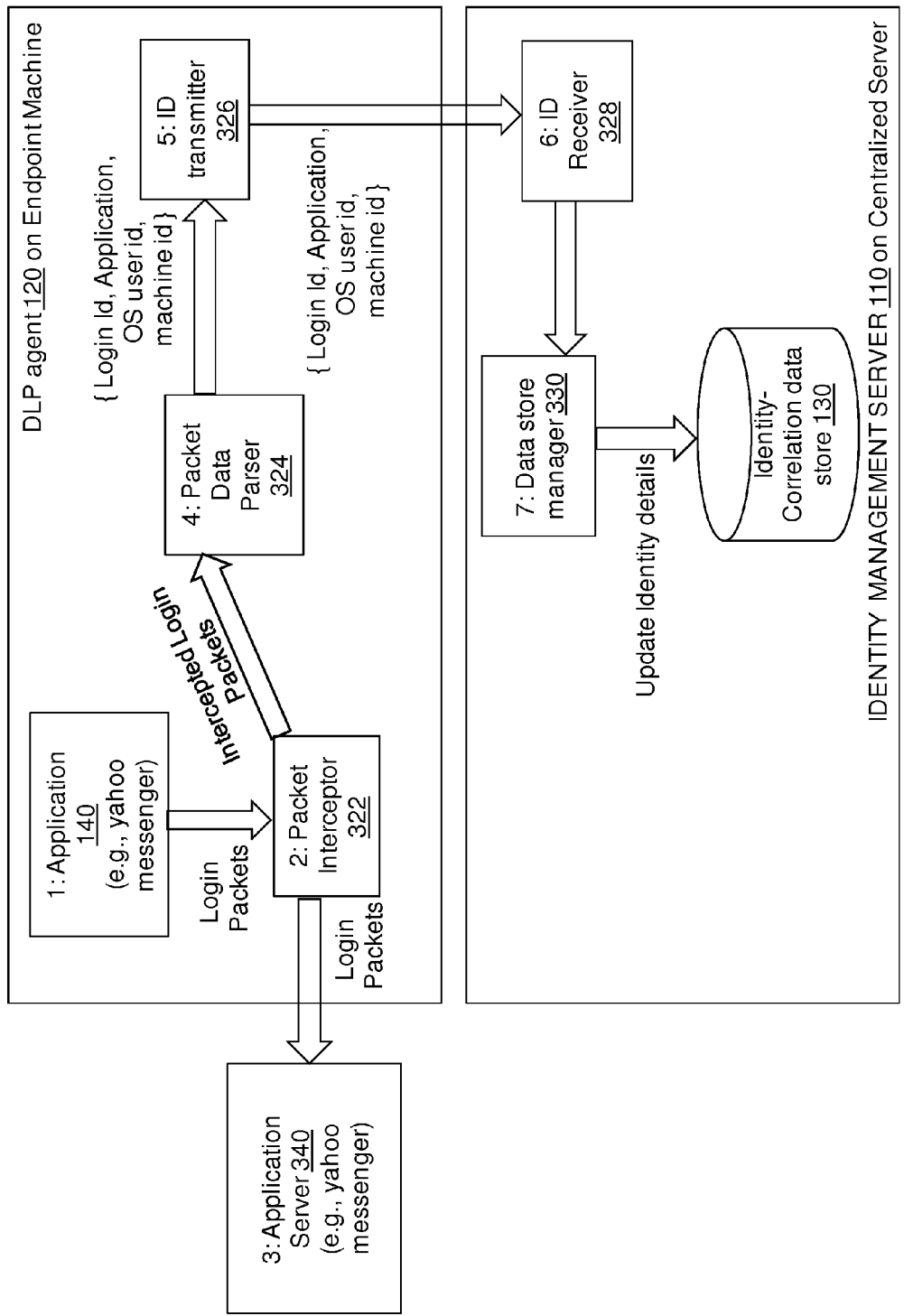
FIG. 3A illustrates an exemplary data flow between a DLP agent and a DLP system for populating an identity-correlation data store according to one embodiment.

FIG. 3A illustrates an exemplary data flow between the DLP agent 120 and the DLP system 106 for populating the identity-correlation data store 130 according to one embodiment. In this embodiment, the DLP agent 120 has a packet interceptor 322 that captures login packets sent from an application 140 to an application server 340. For example, the application 140 may be an instant messaging application, and the packet interceptor 322 captures the login packets sent from the instant messaging application when a user of the endpoint machine logins into the instant messaging service hosted by the application server 340. Applications 140 may send application-specific login packets having an external identifier using, for example, POST/GET/PUT HTTP packets, or a user packet command in FTP, or any proprietary protocol in other cases like Yahoo Messenger, Gmail, etc. The packet interceptor 322 sends the intercepted login packets to a packet data parser 324 that extracts identity information from the intercepted packet. The packet data parser 324 can extract, for example, a login ID, the application, the operating system (OS) user ID, and the machine ID. The packet data parser 324 sends the identity information to a transmitter 326 that sends the identify information to the server computing system (e.g., a centralized server).

In the depicted embodiment, the centralized server uses an ID receiver 328 to receive the identity information from the ID transmitter 326 on the endpoint machine. The ID receiver 328 sends the identity information to a data store manager 330 to update the identity-correlation data store 130. The data store manager 330 sends the updated identity details to the identity-correlation data store 130 to populate or update the identity information stored in the identity-correlation data store 130.

Figure 3B:
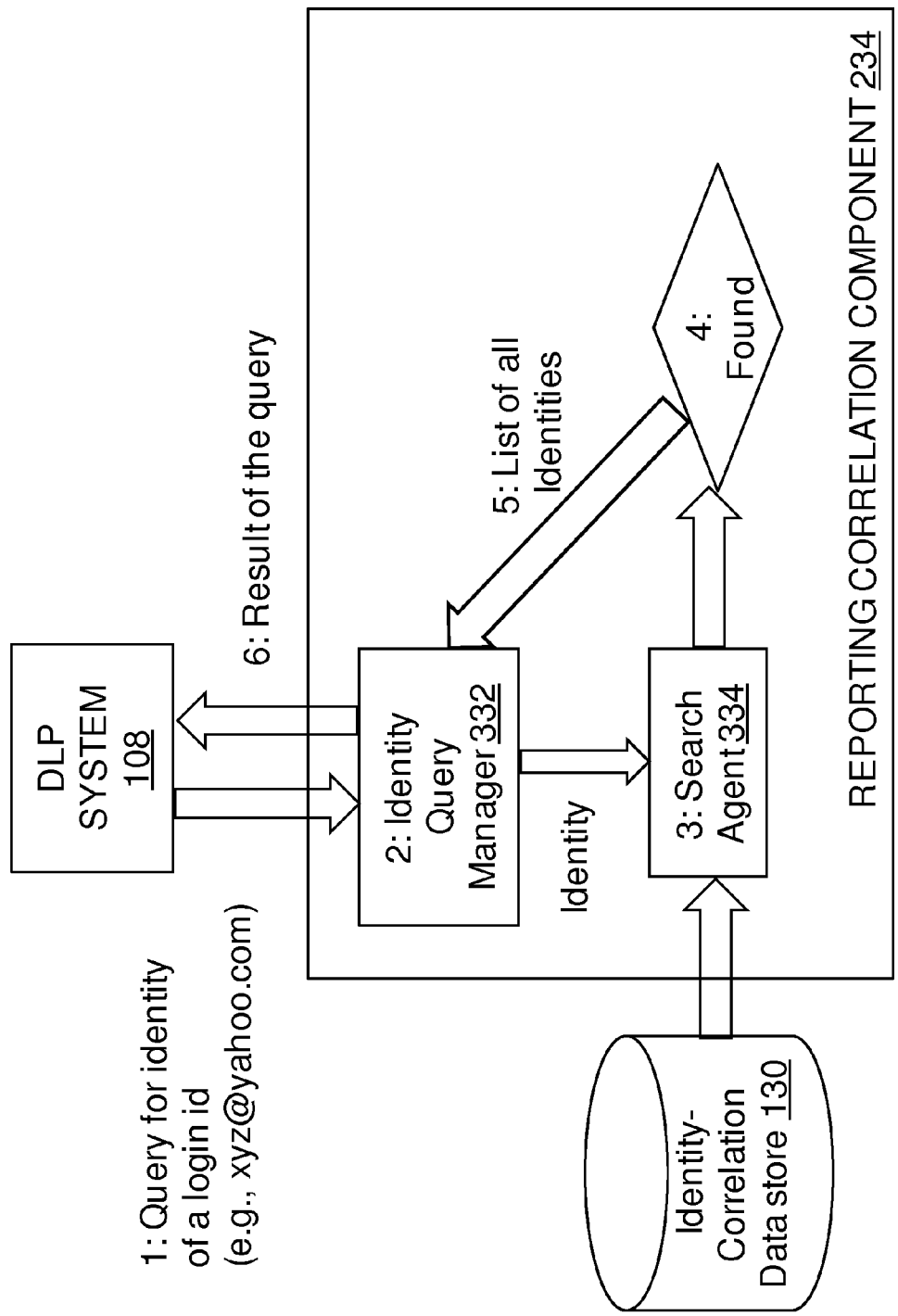
FIG. 3B illustrates an exemplary data flow between the DLP system and a reporting correlation component of the identity management server according to one embodiment.

FIG. 3B illustrates an exemplary data flow between the DLP system 108 and a reporting correlation component 234 of the identity management server 110 according to one embodiment. The reporting correlation component 234 includes an identity query manager 332 that receives, from the DLP system 108, a query for identity of a login id, for example, the instant messaging login ID used for logging into the instant messaging application hosted by the application server 340 (e.g., xyz@yahoo.com). The identity query manager 332 sends the identity to a search agent 334, which searches the identity-correlation data store 130 to find the corresponding unique internal identifier that is mapped to the instant messaging login ID in the query. When the search agent 334 finds one or more matches, the search agent 334 sends the list of identities to the identity query manager 332 and the identity query manager 332 sends the result of the query back to the DLP system 108. In another embodiment, the reporting correlation component 234 can incorporate the identity query manager 332 and search agent 334 into a single component as would be appreciated by one of ordinary skill in the art having the benefit of this disclosure.

Figure 4A:
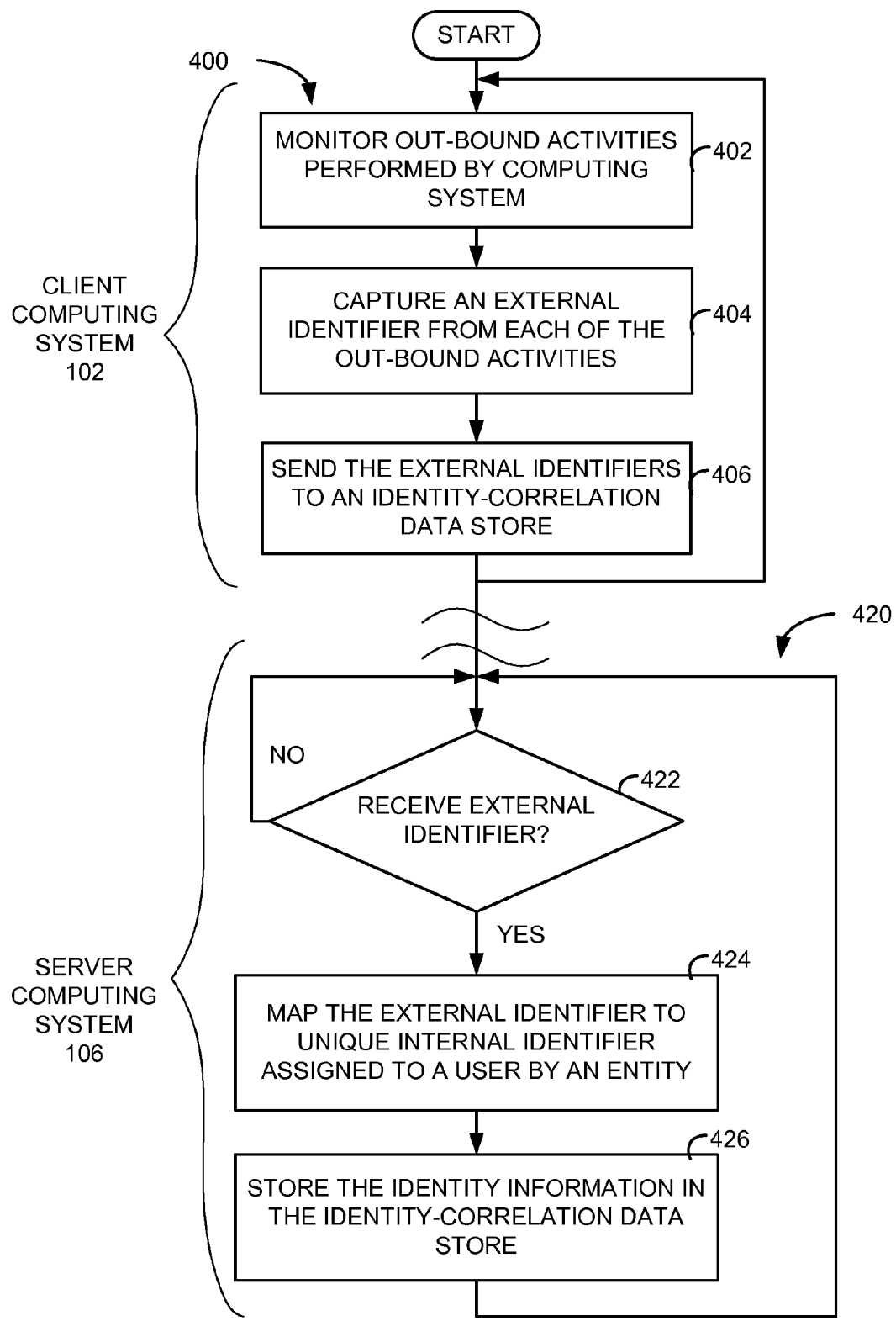
FIG. 4A illustrates one embodiment of methods of populating an identity-correlation data store.

FIG. 4A illustrates one embodiment of methods 400 and 420 of populating an identity-correlation data store. The methods 400 and 420 are performed by processing logic that may comprise hardware (circuitry, dedicated logic, etc.), software (such as is run on a general purpose computing system or a dedicated machine), or a combination of both. In the depicted embodiment, the client computing system 102 of FIG. 1 performs the method 400 and the server computing system 106 performs the method 420. In one embodiment, the DLP agent 120 of FIGS. 1, 2, and 3A performs the method 400, and the identity management server 110 of FIGS. 1, 2, and 3A performs the method 420. Alternatively, other components of the client computing system 102 can be configured to perform some or all of the method 400 and other components of the server computing system 104 can be configured to perform some or all of the method 420.

Referring to FIG. 4A, processing logic begins method 400 by monitoring outbound activities performed by the client computing system (block 402). In one embodiment, the processing logic monitors outbound network traffic. Alternatively, the processing logic monitors other outbound activities, such as data transfers to a USB drive, FTP file transfers, printing activities, or the like. While monitoring in block 402, processing logic captures an external identifier from each of the outbound activities (block 404), and sends the external identifiers to a server computing system having an identity-correlation data store (block 406). As described herein, the identity-correlation data store maps external identifiers to unique internal identifiers assigned to users by an entity. The external identifiers, however, are not assigned by the entity.

In one embodiment of the method 400, the processing logic intercepts a login packet (e.g., mail or IM login packet) to an external service by a particular user of the client computing system and extracts the external identifier from the intercepted packet. The processing logic sends the extracted identifier to the server computing system having the identity-correlation data store at step 406. In a further embodiment, the processing logic decodes the login packet when the packet is encoded.

In another embodiment of the method 400, the processing logic captures one of the unique internal identifiers when one of the users of the client computing system logs into the client computing system or a service provided by the entity, and sends the captured unique internal identifier to the server computing system having the identity-correlation data store. In some cases, more than one user can logon to a machine (e.g., a terminal server). In this case, the agent can accurately determine the unique internal identifier for the corresponding outbound data transfer. Also, as described herein, a non-DLP agent can utilize the identity interception component to extract external identifiers from outbound traffic to be mapped to unique internal identifiers using the identity-correlation data store.

Referring back to FIG. 4A, processing logic begins method 420 by determining if an external identifiers has been received from the client computing system 102 (block 422). If not, the processing logic waits until an external identifier is received at block 422. If the external identifier is received at block 422, the processing logic maps the external identifier to the unique internal identifier assigned to the user by the entity (block 424), and stores the identity information in the identity-correlation data store (block 426). The processing logic returns to block 422 to determine if another external identifier has been received.

When the processing logic receives a unique internal identifier from the client computing system, as described above with respect to method 400, the processing logic creates an entry in the identity-correlation data store when there are no entries containing the captured unique internal identifier. For example, when the processing logic receives a unique internal identifier for the first time, the processing logic creates an entry for the unique internal identifier, and subsequently maps the external identifiers with this unique internal identifier.

Figure 4B:
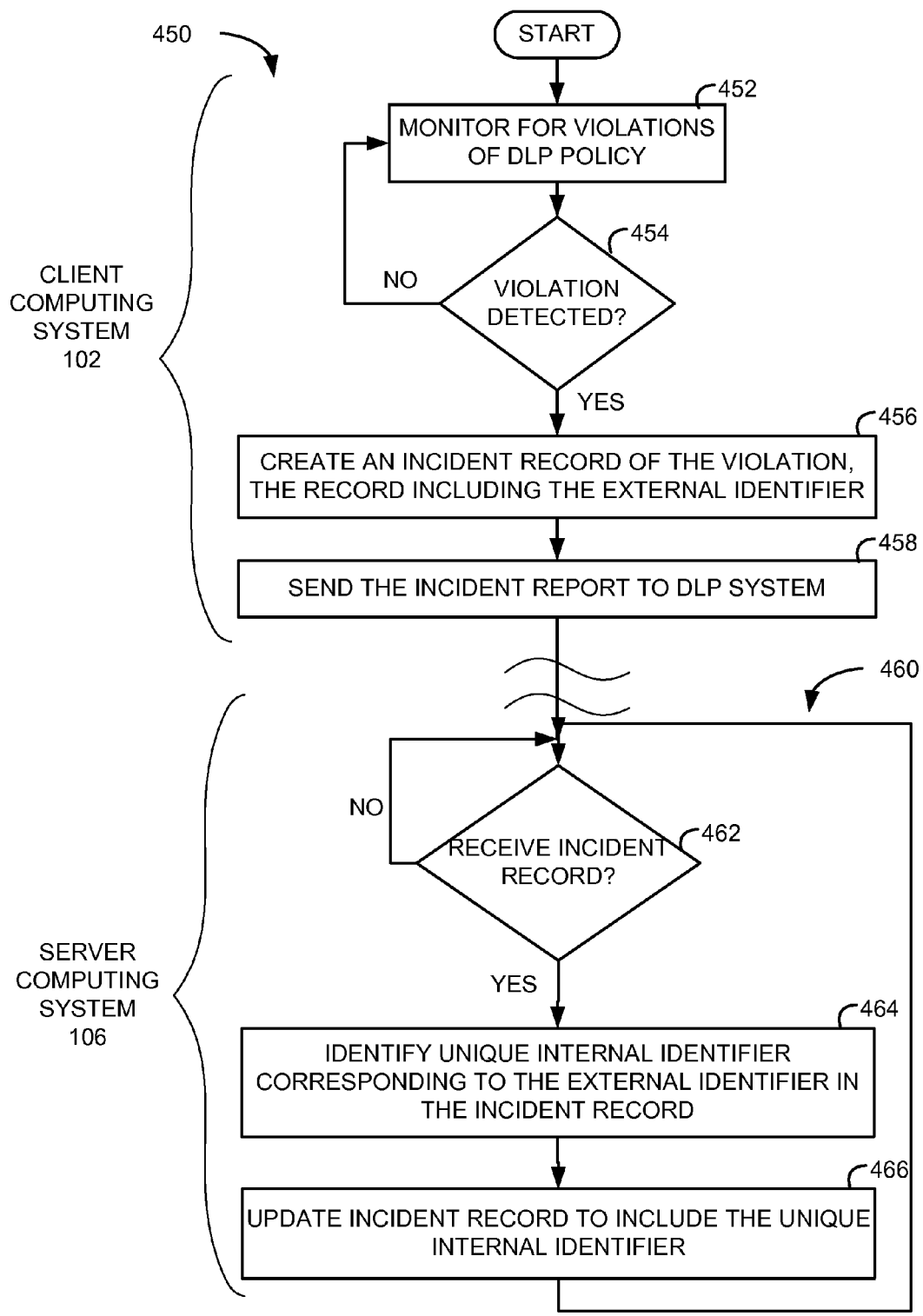
FIG. 4B illustrates one embodiment of methods of using the identity-correlation data store to update incident records to unique internal identifiers.

FIG. 4B illustrates one embodiment of methods 450 and 460 of using the identity-correlation data store to update incident records to unique internal identifiers. The methods 450 and 460 are performed by processing logic that may comprise hardware (circuitry, dedicated logic, etc.), software (such as is run on a general purpose computing system or a dedicated machine), or a combination of both. In the depicted embodiment, the client computing system 102 of FIG. 1 performs the method 450 and the server computing system 106 performs the method 460. In one embodiment, the DLP agent 120 of FIGS. 1, 2, and 3A performs the method 450, and the identity management server 110 of FIGS. 1, 2, and 3A performs the method 460. Alternatively, other components of the client computing system 102 can be configured to perform some or all of the method 450 and other components of the server computing system 104 can be configured to perform some or all of the method 460.

Referring to FIG. 4B, processing logic of method 450 begins by monitoring for violations of the DLP policy (block 452). At block 454, the processing logic determines if a violation has been detected (block 454). If not, the processing logic continues monitoring at block 452. If a violation is detected at block 454, the processing logic creates an incident record including one of the external identifiers being used by a particular user when the violation occurred (block 456), and sends the incident record to the DLP system (block 458).

Referring to FIG. 4B, processing logic of method 460 begins by determining if an incident record has been received from the client computing system 102 (block 462). If not, the processing logic continues to monitor for incoming incident records. If the processing logic receives an incident record at block 462, the processing logic identifies the unique internal identifier corresponding to the external identifier in the incident record using the identity-correlation data store (block 464), and updates the incident record to include the unique internal identifier (block 466). FIGS. 6A and 6B, which are described below, illustrate an incident record and an updated incident record, respectively.

In one embodiment, the processing logic performs a look-up operation in the identity-correlation data store using the external identifier in the incident report to identify the corresponding user.

In another embodiment, the client computing system intercepts a login packet to an external service, and sends the intercepted login packet to the server computing system 106 as is. The processing logic of the server computing system 106 receives the intercepted login packet, and extracts the external identifier from the intercepted login packet. In another embodiment, the processing logic of the server computing system 106 decodes the login packet when encoded.

Figure 5:
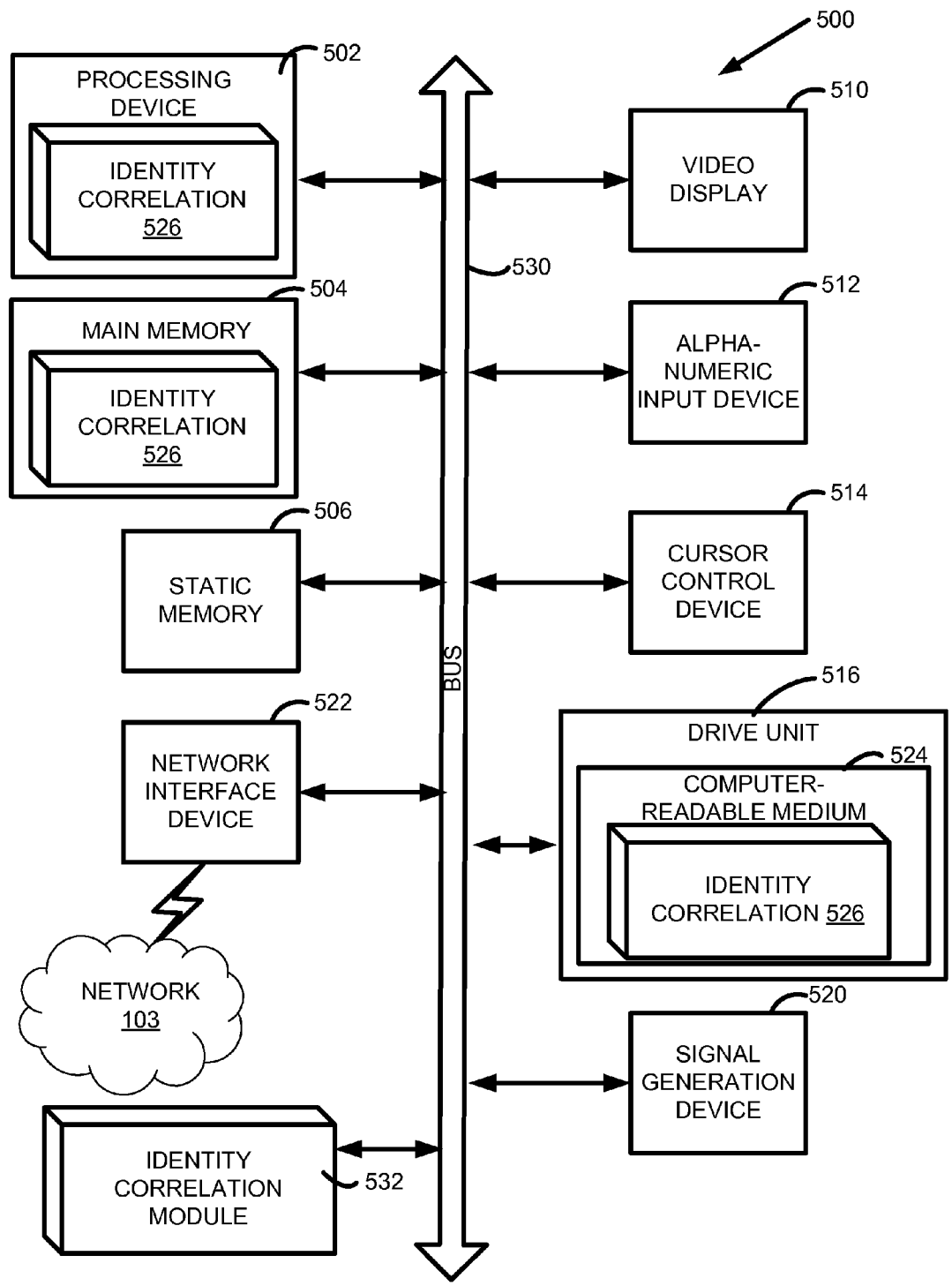
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 400, 420, 450, and 460 of FIGS. 4A and 4B.

The exemplary computing system 500 includes a processing device (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for identity correlation 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., identity correlation 526) embodying any one or more of the methodologies or functions described herein. The identity correlation 526 may also reside, completely or at least partially, within the main memory 504 and/or within the processor 502 during execution thereof by the computing system 500, the main memory 504, and the processor 502 also constituting computer-readable media. The identity correlation 526 may further be transmitted or received over a network 520 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The identity correlation module 532, components, and other features described herein (for example in relation to FIGS. 1, 2, 3A, and 3B) can be implemented as discrete hardware components or integrated in the functionality of hardware components such as ASICS, FPGAs, DSPs, or similar devices. The identity correlation module 532 may implement operations of identity correlation as described herein with respect to FIGS. 4A and 4B. In addition, the identity correlation module 532 can be implemented as firmware or functional circuitry within hardware devices. Further, the identity correlation module 532 can be implemented in any combination hardware devices and software components.

FIG. 6A illustrates an incident record 600 having an external identifier 601 according to one embodiment. The incident record 600 includes the incident details, as well as the external identifier 601 being used by the particular user when the violation occurred. In the depicted embodiment, the external identifier 601 is the Yahoo messenger identifier mp38402 kd. This identifier is cryptic and cannot be used to identify a particular user.

FIG. 6B illustrates an updated incident record 650 having a unique internal identifier 651 associated with the external identifier 601 in the incident record 600 according to one embodiment. The incident record 650 includes the same incident details, but includes the unique internal identifier 651 associated with the particular user that caused the violation. In the depicted embodiment, the unique internal identifier 651 is domain/some.user, which has been assigned to the particular user by the entity. The updated incident record 650 may also include the external identifier 601, such as shown in the parenthetical of the sender information. In another embodiment, the updated incident record 650 can be configured to display more details about the identified user. For example, as depicted in FIG. 6B when an operator or administrator reviewing the incident record moves the mouse (or any cursor) over the sender identity, the incident record 650 would should the other external identifiers used by this user, if any. In the depicted embodiment, the user corresponding to the unique internal identifier 651 uses the following identities: Yahoo messenger ID (mp38402 kd@yahoo.com), Facebook ID (mprosue23@yahoo.com), and Gmail ID (someuser@gmail.com). Of course, these external identifiers are for illustration purposes and other external identifiers may be associated with the unique internal identifier 651. In one embodiment, the updated incident record 651 uses a tooltip 652 to display the additional identity information. The user hovers the cursor over an item, and without clicking the item, the tooltip 652 may appear. The tooltip 652 may be a "hover box" with the additional information about the item being hovered over. Alternatively, the updated incident record 651 may be configured to display the additional information in other ways as would be appreciated by one of ordinary skill in the art having the benefit of this disclosure.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
monitoring, by a data loss prevention (DLP) agent hosted on the computing system, outbound activities performed by the computing system;
capturing, by the DLP agent, an external identifier from each of the outbound activities;
sending the external identifier to a server computing system having an identity-correlation data store, wherein the identity-correlation data store maps external identifiers to unique internal identifiers assigned to users by an entity, and wherein the external identifiers are not assigned by the entity;
detecting a violation of a DLP policy by the DLP agent;
creating, by the DLP agent, an incident record of the violation of the DLP policy, the incident record comprising one of the external identifiers being used by a particular user when the violation occurred; and
sending the incident record to the server computing system, wherein the server computing system updates the incident record to include the unique internal identifier corresponding to the particular user associated with the external identifier using the identify-correlation data store.

2. The method of claim 1, wherein the monitoring comprises at least one of the following:
monitoring outbound network traffic;
monitoring outbound data transfers; or
monitoring printing activities.

3. The method of claim 1, wherein the capturing comprises:
intercepting a login packet sent to an external service by a particular user of the computing system; and
extracting the external identifier from the intercepted login packet.

4. The method of claim 3, wherein the capturing further comprises decoding the login packet when encoded.

5. The method of claim 1, further comprising:
capturing one of the unique internal identifiers when one of the users of the computing system logs into the computing system or a service provided by the entity; and
sending the captured unique internal identifier to the server computing system having the identity-correlation data store, wherein the server computing system creates an entry in the identity-correlation data store when there are no entries containing the captured unique internal identifier.

6. The method of claim 1, further comprising performing a look-up operation in the identity-correlation data store using the external identifier in the incident report to identify the one of the users.

7. A non-transitory computer readable storage medium storing instructions that when executed by a client computing system cause the client computing system to perform operations comprising:
monitoring, by a data loss prevention (DLP) agent hosted on the client computing system, outbound activities performed by the client computing system;
capturing, by the DLP agent, an external identifier from each of the outbound activities;
sending the external identifier to a server computing system having an identity-correlation data store, wherein the identity-correlation data store maps external identifiers to unique internal identifiers assigned to users by an entity, and wherein the external identifiers are not assigned by the entity;
detecting a violation of a DLP policy by the DLP agent;
creating, by the DLP agent, an incident record of the violation of the DLP policy, the incident record comprising one of the external identifiers being used by a particular user when the violation occurred; and
sending the incident record to the server computing system, wherein the server computing system updates the incident record to include the unique internal identifier corresponding to the particular user associated with the external identifier using the identify-correlation data store.

8. The non-transitory computer readable storage medium of claim 7, wherein the monitoring comprises at least one of the following:
monitoring outbound network traffic;
monitoring outbound data transfers; or
monitoring printing activities.

9. The non-transitory computer readable storage medium of claim 7, wherein the capturing comprises:
intercepting a login packet sent to an external service by a particular user of the client computing system; and
extracting the external identifier from the intercepted login packet.

10. The non-transitory computer readable storage medium of claim 9, wherein the capturing further comprises decoding the login packet when encoded.

11. The non-transitory computer readable storage medium of claim 7, wherein the operations further comprise:
capturing one of the unique internal identifiers when one of the users of the client computing system logs into the client computing system or a service provided by the entity; and
sending the captured unique internal identifier to the server computing system having the identity-correlation data store, wherein the server computing system creates an entry in the identity-correlation data store when there are no entries containing the captured unique internal identifier.

12. A system comprising
a client computing system, comprising:
a memory; and
a processor coupled with the memory to
monitor, by a data loss prevention (DLP) agent hosted on the client computing system, outbound activities performed by the client computing system;
capture, by the DLP agent, an external identifier from each of the outbound activities;
send the external identifier to a server computing system having an identity-correlation data store, wherein the identity-correlation data store maps external identifiers to unique internal identifiers assigned to users by an entity, and wherein the external identifiers are not assigned by the entity;
detect a violation of a DLP policy by the DLP agent;
create, by the DLP agent, an incident record of the violation of the DLP policy, the incident record comprising one of the external identifiers being used by a particular user when the violation occurred; and
send the incident record to the server computing system, wherein the server computing system updates the incident record to include the unique internal identifier corresponding to the particular user associated with the external identifier using the identify-correlation data store.

13. The system of claim 12, wherein the DLP agent is to monitor at least one of an outbound network traffic, outbound data transfers, or printing activities.

14. The system of claim 12, wherein the DLP agent is further to:
   intercept a login packet sent to an external service by a particular user of the client computing system; and
   extract the external identifier from the intercepted login packet.

15. The system of claim 14, wherein the DLP agent is to decode the login packet when encoded.

16. The system of claim 12, wherein the DLP agent is further to:
   capture one of the unique internal identifiers when one of the users of the client computing system logs into the client computing system or a service provided by the entity; and
   send the captured unique internal identifier to the server computing system having the identity-correlation data store, wherein the server computing system creates an entry in the identity-correlation data store when there are no entries containing the captured unique internal identifier.

17. The system of claim 12, further comprising the server computing system, communicatively coupled to the client computing system, the server computing system comprising:
   a second memory; and
   a second processor coupled to the memory to:
      receive from one or more DLP agents hosted by one or more client computing systems, a plurality of external identifiers captured by the one or more agents while monitoring outbound activities performed by the one or more client computing systems, and
      map each of the plurality of external identifiers to a corresponding one of a plurality of unique internal identifiers in an identity-correlation data store, wherein the plurality of unique internal identifiers are assigned to a plurality of users by an entity, and wherein the plurality of external identifiers are not assigned by the entity.

18. The system of claim 17, wherein the second processor is further configured to execute a DLP system communicatively coupled to the one or more DLP agents and the second processor is further configured to:
   subsequently receive the incident record of the violation of the DLP policy from the DLP agent of the client computing system;
   identify a corresponding one of the plurality of unique internal identifiers correlated to the one external identifier in the incident record using the identity-correlation data store to identify one of the plurality of users associated with the one external identifier; and
   update the incident record to include the identified unique internal identifier.

19. The system of claim 12, wherein the DLP agent comprises:
   a packet interceptor to capture a login packet sent by an application to an external service hosted by an application server;
   a packet data parser to receive the captured login packet from the packet interceptor and to extract the external identifier from the captured login packet; and
   a transmitter to send the extracted external identifier to the server computing system having the identity-correlation data store.

20. The system of claim 17, wherein the second processor is configured to create an entry in the identity-correlation data store when there are no entries containing the captured unique internal identifier.

* * * * *

UNITED STATES PATENT AND TRADEMARK OFFICE
CERTIFICATE OF CORRECTION

PATENT NO.        : 8,868,754 B1                                   Page 1 of 1
APPLICATION NO.   : 13/895658
DATED             : October 21, 2014
INVENTOR(S)       : Manish Pai It is certified that error appears in the above-identified patent and that said Letters Patent is hereby corrected as shown below:

In the Claims

In claim 1, column 15, line 28, delete "identify-correlation" and insert --identity-correlation--

In claim 7, column 16, line 13, delete "identify-correlation" and insert --identity-correlation--

In claim 12, column 17, line 1/2, delete "identify-correlation" and insert --identity-correlation--

Signed and Sealed this
Fourteenth Day of April, 2015

Michelle K. Lee
*Director of the United States Patent and Trademark Office*